United States Patent
Moreau et al.

(10) Patent No.: US 9,752,837 B2
(45) Date of Patent: Sep. 5, 2017

(54) MANIFOLD INTENDED, IN PARTICULAR, FOR A BATTERY COOLER, AND HEAT EXCHANGER COMPRISING AT LEAST ONE SUCH MANIFOLD

(71) Applicant: Valeo Systemes Thermiques, Le Mesnil-Saint-Denis (FR)

(72) Inventors: Sylvain Moreau, Spay (FR); Francois Busson, Saint Gervais en Belin (FR); Alain Pourmarin, La-Suze-sur-sarthe (FR); Philippe Doucet, Sable (FR); Mohamed Ibrahimi, Allonnes (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 424 days.

(21) Appl. No.: 14/359,660

(22) PCT Filed: Nov. 20, 2012

(86) PCT No.: PCT/EP2012/073141
§ 371 (c)(1),
(2) Date: May 21, 2014

(87) PCT Pub. No.: WO2013/076104
PCT Pub. Date: May 30, 2013

(65) Prior Publication Data
US 2014/0299302 A1     Oct. 9, 2014

(30) Foreign Application Priority Data
Nov. 22, 2011  (FR) ..................... 11 60618

(51) Int. Cl.
*F28F 9/22*  (2006.01)
*F28F 9/26*  (2006.01)
(Continued)

(52) U.S. Cl.
CPC ............... *F28F 9/02* (2013.01); *B23P 15/26* (2013.01); *F28F 1/02* (2013.01); *F28F 9/0209* (2013.01);
(Continued)

(58) Field of Classification Search
CPC ...... F28F 9/0214; F28F 9/0217; F28F 9/0221; F28F 9/0229; F28D 1/05325; F28D 2021/0043
(Continued)

(56) References Cited

U.S. PATENT DOCUMENTS 1,782,394 A * 11/1930 Beimling ................. F01P 3/18
                                                                    165/140
2,733,899 A *  2/1956 Lehmann ............ F28D 1/05391
                                                                    165/176
(Continued)

FOREIGN PATENT DOCUMENTS

FR   2 780 152 A1   12/1999
FR   2 803 376 A1    7/2001
(Continued)

OTHER PUBLICATIONS

International Search Report for Application No. PCT/EP2012/073141 dated Dec. 11, 2012, 5 pages.
(Continued)

*Primary Examiner* — Leonard R Leo
(74) *Attorney, Agent, or Firm* — Howard & Howard Attorneys PLLC

(57) ABSTRACT

The invention relates to a manifold (10) for a heat exchanger (1), comprising a cover (31), an intermediary plate (41), and a collector plate (51), said manifold (10) being intended to collect and distribute a fluid. According to the invention, the intermediary plate (41) defines a first fluid chamber (11) with the cover (31) and a second fluid chamber (12) with the
(Continued)

collector plate (51), said second chamber being independent of the first (11). The invention also relates to a heat exchanger (1) comprising such a manifold (10) and to a method for producing such a manifold (10).

17 Claims, 2 Drawing Sheets

(51) Int. Cl.
*F28F 9/02* (2006.01)
*F28F 1/02* (2006.01)
*B23P 15/26* (2006.01)
*F28D 1/053* (2006.01)
*F28D 21/00* (2006.01)

(52) U.S. Cl.
CPC .......... *F28F 9/0221* (2013.01); *F28F 9/0224* (2013.01); *F28F 9/0229* (2013.01); *F28D 1/05325* (2013.01); *F28D 2021/0028* (2013.01); *F28D 2021/0043* (2013.01); *Y10T 29/49389* (2015.01)

(58) Field of Classification Search
USPC ................................. 165/174–176, 140, 144
See application file for complete search history.

(56) References Cited

U.S. PATENT DOCUMENTS

| | | | | | |
|---|---|---|---|---|---|
| 2,991,978 | A | * | 7/1961 | Jones | F22B 1/08 165/174 |
| 3,173,482 | A | * | 3/1965 | Allender | F28F 9/0217 165/174 |
| 4,121,656 | A | * | 10/1978 | Huber | F28F 9/0212 165/174 |
| 4,297,991 | A | * | 11/1981 | Easton | B21D 53/06 126/628 |
| 4,323,116 | A | * | 4/1982 | Zimmerman | F28F 9/0202 165/176 |
| 4,396,060 | A | * | 8/1983 | Schenk | F28F 9/0217 165/176 |
| 4,458,750 | A | * | 7/1984 | Huber | F28F 9/0278 165/174 |
| 4,923,001 | A | * | 5/1990 | Marcolin | F28F 9/0234 165/140 |
| 4,971,145 | A | * | 11/1990 | Lyon | F28F 9/0209 165/173 |
| 5,168,925 | A | * | 12/1992 | Suzumura | F28F 9/02 165/174 |
| 5,203,407 | A | * | 4/1993 | Nagasaka | F28D 1/05375 165/174 |
| 5,228,315 | A | * | 7/1993 | Nagasaka | F25B 39/04 165/176 |
| 5,573,061 | A | * | 11/1996 | Chiba | F28D 1/05341 165/174 |
| 5,934,367 | A | * | 8/1999 | Shimmura | F25B 39/028 165/174 |
| 6,341,648 | B1 | * | 1/2002 | Fukuoka | B21C 37/0803 165/174 |
| 2002/0179295 | A1 | | 12/2002 | Palanchon | |

FOREIGN PATENT DOCUMENTS

| | | | |
|---|---|---|---|
| JP | 55028476 A | * | 2/1980 |
| JP | 04353397 A | * | 12/1992 |
| JP | H 11-281287 A | | 10/1999 |

OTHER PUBLICATIONS

English language abstract and machine-assisted English translation for FR 2 780 152 extracted from espacenet.com database on Jul. 9, 2014, 21 pages.

English language abstract for FR 2 803 376 extracted from espacenet.com database on Jul. 9, 2014, 1 page.

English language abstract and machine-assisted English translation for JPH 11-281287 extracted from espacenet.com database on Jul. 9, 2014, 31 pages.

\* cited by examiner

MANIFOLD INTENDED, IN PARTICULAR, FOR A BATTERY COOLER, AND HEAT EXCHANGER COMPRISING AT LEAST ONE SUCH MANIFOLD

RELATED APPLICATIONS

This application is the National Stage of International Patent Application No. PCT/EP2012/073141, filed on Nov. 20, 2012, which claims priority to French Patent Application No. FR 11/60618, filed on Nov. 22, 2011, the content of which is incorporated herein by reference.

The invention applies to the field of heat exchangers, for example battery coolers, and in particular batteries in vehicles with electric and/or hybrid motors. The object of the invention is an exchanger of this kind and a manifold comprising the exchanger.

The electrical energy for vehicles with an electric and/or hybrid motor is supplied by one or more batteries. One problem lies in the fact that batteries are liable to heat up and are thus susceptible to damage during operation. It is thus necessary to use battery coolers to maintain them at an acceptable temperature. Such coolers include a tube bundle which connects at least two manifolds to one another, the corresponding ends of the tubes being connected in a fixed and leak-tight manner in said manifolds. A coolant can then flow through the tubes and manifolds to ensure a heat exchange with the batteries.

One difficulty which needs to be overcome is the problem of cooling the batteries in an effective, regulated and uniform manner for all batteries. To this end, the idea was to position a plurality of battery coolers in series by connecting them using a plurality of manifolds which are assembled and soldered to one another in order to connect the various coolers. One disadvantage stems from the fact that the assembled manifolds are not all the same and thus require different production methods and a logistic management system which is adapted to each manifold. Depending on the number of batteries to be cooled, the number of coolers positioned in series one after the other is varied, which thus means that many different components have to be managed.

Battery coolers are subject to different types of mechanical stresses originating from the vehicle in which they are installed. If the cooler comprises a manifold assembly with a different design, another problem then lies in guaranteeing the rigidity of the respective connections between the assembled manifolds in such cases.

Another disadvantage is due to the fact that the tubes have different lengths depending on the assembled manifolds which they are connecting, thus making it necessary to produce and store tubes of different lengths.

The invention seeks to improve the situation.

To this end the invention proposes a heat exchanger manifold comprising a cover, an intermediary plate and a collector plate, said manifold being intended to collect and distribute a fluid. According to the invention the intermediary plate defines a first fluid chamber with the cover and a second fluid chamber with the collector plate, said second chamber being independent of the first.

Independent is understood to mean that the second chamber is isolated from the first chamber with respect to the fluid. In other words, the fluid cannot pass directly from the first chamber to the second chamber without passing through the exchanger passages. The first and second chamber are thus sealed from each other.

The invention thus provides two chambers or fluid flow collectors which are distinct, but grouped within a single manifold. The manifolds are standardised in this case. The invention does away with the disadvantages associated with the presence of manifolds with different designs and/or structures which need to be assembled together. Another advantage is down to the reduced space taken up by the manifold according to the invention, which only comprises three plates. The plates forming the manifold are also designed to be assembled together so as to ensure sufficient rigidity to withstand the mechanical stresses experienced by the exchanger.

Another advantage is due to assembly of the manifold according to the invention, which requires fewer operations than the known solution. Indeed, thanks to the invention, it is no longer necessary to manufacture two distinct manifolds before assembling them together. It is merely necessary to assemble the cover, the intermediary plate and the collector plate.

According to one aspect of the invention, the intermediary plate has a first face and a second face opposite the first face and comprises a first deformation intended to admit fluid to the first chamber and a second deformation intended to allow fluid to leave the first chamber. The first and second deformations are located at opposite longitudinal ends of the intermediary plate.

The intermediary plate advantageously comprises a third deformation located between the first and second deformations along a longitudinal direction of the manifold. This enables fluid to flow, particularly between the first and second deformations.

According to one embodiment of the invention, the third deformation protrudes with respect to the first face of the intermediary plate, the first and second deformations of the intermediary plate protruding with respect to the second face of the intermediary plate. In other words, the first and second deformations extend in one first direction and the third deformation extends in another second direction which is opposite to the first direction.

According to one aspect of the invention, the cover comprises a cavity which enables fluid to flow between the first deformation and the second deformation. The third deformation extends into the cavity, for example.

The cover advantageously comprises an edge located around the periphery of the cavity and arranged in contact with a rim of the intermediary plate surrounding the first, second and third deformations. The edge is soldered to the rim of the first face, for example.

According to one embodiment of the invention, the cover is positioned opposite the first face of the intermediary plate, in a position covering the first, second and third deformations.

According to one embodiment of the invention, the collector plate is positioned opposite the second face of the intermediary plate, in a position covering the third deformation.

The collector plate advantageously comprises a recess intended to allow fluid to enter and leave the second chamber.

According to one embodiment of the invention, the collector plate comprises a peripheral face surrounding the recess and is positioned in contact with a rim surrounding the third deformation of the intermediary plate. The peripheral face is in particular soldered to the rim of the second face.

According to one aspect of the invention, the first deformation, the second deformation and the recess each comprise at least one slot which is capable of receiving a fluid flow tube.

The cover, the intermediary plate and the collector plate are advantageously substantially rectangular in shape, said slots having an elongated shape in a direction which runs substantially parallel to a longitudinal axis of the cover, the intermediary plate and the collector plate.

According to one embodiment of the invention, the slots in the first deformation, the second deformation and the recess comprise an opening to the outside of said manifold, these being located in substantially the same plane. Thus, thanks to the invention it is possible to connect tubes of the same length to the first and second chambers.

The invention also relates to a heat exchanger, in particular a battery cooler, comprising at least one manifold as defined above.

According to one aspect of the invention, the exchanger comprises a bundle of fluid flow tubes, said tubes being the same length and having a first longitudinal end which penetrates said manifold. In this case it is assumed that the tubes are the same length to within manufacturing tolerance values. Thanks to the invention, the tubes only need to be manufactured in one length, which simplifies the logistics of tube management. The tubes are advantageously extruded and comprise a plurality of channels.

According to an embodiment of the invention, the tubes are substantially oblong in shape, defined by two large faces, referred to as the first and second large faces, and two small faces, the tubes being arranged such that the first large faces extend in the same plane. It is thus possible to position batteries directly on the largest part of the tube in terms of surface area, in other words on the first large face.

According to one aspect of the invention, in which the first and second chambers each receive four tubes.

The exchanger is advantageously arranged such that the fluid flows into the first chamber in a first direction and into the second chamber in a second direction which is opposite to the first. Thanks to this arrangement of the two chambers, the fluid may enter and leave on the same side of the exchanger.

According to an embodiment of the invention, the exchanger comprises an inlet enclosure comprising a fluid inlet, an outlet enclosure comprising a fluid outlet and an intermediate enclosure such that said exchanger defines four fluid passages: a first passage between the inlet enclosure and the first chamber, a second passage between the first chamber and the intermediate enclosure, a third passage between the intermediate enclosure and the second chamber and a fourth passage between the second chamber and the outlet enclosure. In this way it is possible to create a single exchanger by interconnecting two smaller exchangers. In a similar manner it is thus possible to connect a number of exchangers in series to create just one single exchanger comprising a plurality of manifolds according to the invention.

The invention also relates to a production method for a heat exchanger manifold, said manifold comprising a cover, an intermediary plate and a collector plate. According to the invention, the cover, the intermediary plate and the collector plate are dished and a disconnectable mechanical connection means is created between the cover, the intermediary plate and the collector plate in the same forming stage.

Thanks to the invention, in addition to only having one manifold instead of two, the constituent parts of the manifold being obtained in one single manufacturing stage. In addition, they are connected to each other simultaneously during manufacture such that they can be stored and transported together.

According to one aspect of the invention, the mechanical connection means is disconnected prior to assembling the cover on the intermediary plate and the collector plate on the intermediary plate with a view to forming said manifold. This connection means is disconnected in order to position the cover, the intermediary plate and the collector plate onto one another such that they are able to be soldered together.

The attached figures clearly show how the invention can be achieved. In these figures, identical reference numerals refer to similar elements.

Figure 1:
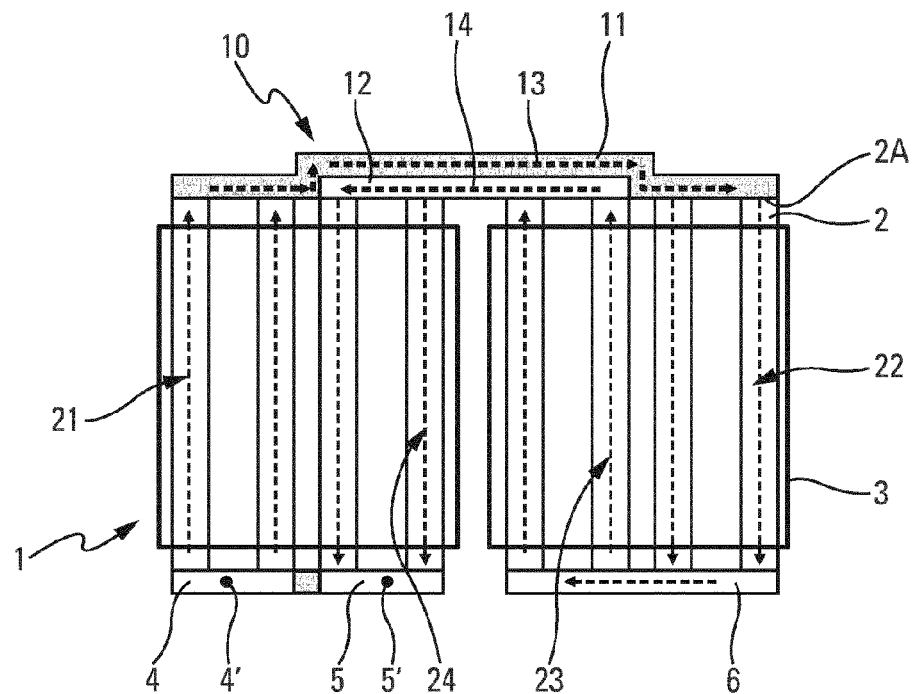
FIG. 1 is a schematic plan view of an embodiment of a heat exchanger comprising a manifold according to the invention.

The invention may be applied in a heat exchanger 1 as shown on FIG. 1. This may, for example, be a radiator for cooling batteries in an automotive vehicle, operating in particular in a loop containing a known coolant, a refrigerant or a refrigerating fluid such as those which go under the acronyms of R134a or R744 (carbon dioxide), for example. It comprises a bundle of parallel tubes 2. The tubes 2 are the same length and each have a first longitudinal end 2A which is connected in a fixed and leak-tight manner to a manifold 10, known as the first manifold 10, according to the invention and located at the top of FIG. 1. The tubes 2 are soldered to the first manifold 10, for example. Said manifold is intended to collect the fluid arriving from the tubes 2, in other words it comprises an area in which the fluid is forced to enter the first manifold. It is also intended to distribute the fluid through the tubes 2, in other words it comprises an area in which the fluid is forced to leave the first manifold 10. The tubes 2 are extruded, for example, and comprise a plurality of channels so as to improve the thermal efficiency and pressure resistance of the tubes 2, in particular. The exchanger 1 thus cools the batteries 3 by positioning them directly on the tubes 2 in this case.

Such an exchanger 1 also comprises an inlet enclosure 4 comprising an inlet 4' via which the fluid is admitted to the exchanger 1, an outlet enclosure 5, comprising an outlet 5' via which the fluid is discharged from the exchanger 1, and an intermediate enclosure 6. In this case, the inlet enclosure 4 and the outlet enclosure 5 form a single enclosure, but could be separate from each other.

According to the invention the first manifold 10 defines a first chamber 11 and a second chamber 12 in which fluid can circulate, these being independent of one another. In other words, the first manifold 10 defines a first fluid flow collector and a second fluid flow collector, said collectors not being directly connected to one another.

Thus, in this embodiment, the fluid enters the exchanger 1 in the vicinity of the inlet 4' of the inlet enclosure 4 and then passes through a first passage 21 which is defined here by two tubes 2 connecting the inlet enclosure to the first chamber 11. It then passes into the first chamber 11, circulates within said chamber and leaves again to pass through a second passage 22, which is, for example, defined by two tubes 2 connecting the first chamber 11 to the intermediate enclosure 6. The fluid then flows inside the intermediate enclosure 6 before leaving said enclosure to pass through a third passage 23, defined in particular by two tubes 2 connecting the intermediate enclosure 6 to the second chamber 12. It then flows inside the second chamber and leaves to pass through a fourth passage 24 taking it from the second chamber 12 to the outlet enclosure 5 and to its outlet 5'.

The exchanger 1 is thus arranged such that the fluid flows into the first chamber 11 in a first direction represented by the arrow marked as 13 and into the second chamber 12 in a second direction represented by the arrow marked as 14 in an opposite direction to the first direction. This arrangement thus allows a plurality of exchangers to be positioned in series, two in this case, so as to specifically cool a plurality of batteries, whilst proposing an inlet 4' and an outlet 5' for fluid from the same side of the exchanger 1 and being adjacent in particular. This arrangement of the inlet 4' and the outlet 5' makes it easier to manage the space required to incorporate the exchanger 1 in the vehicle, and in particular the space required to connect the inlet and outlet elements to the exchanger 1. Such elements (not illustrated) may, for example, be nozzles and may thus be connected on the same side of the exchanger 1 so as to limit the space taken up by these elements.

Figure 2:
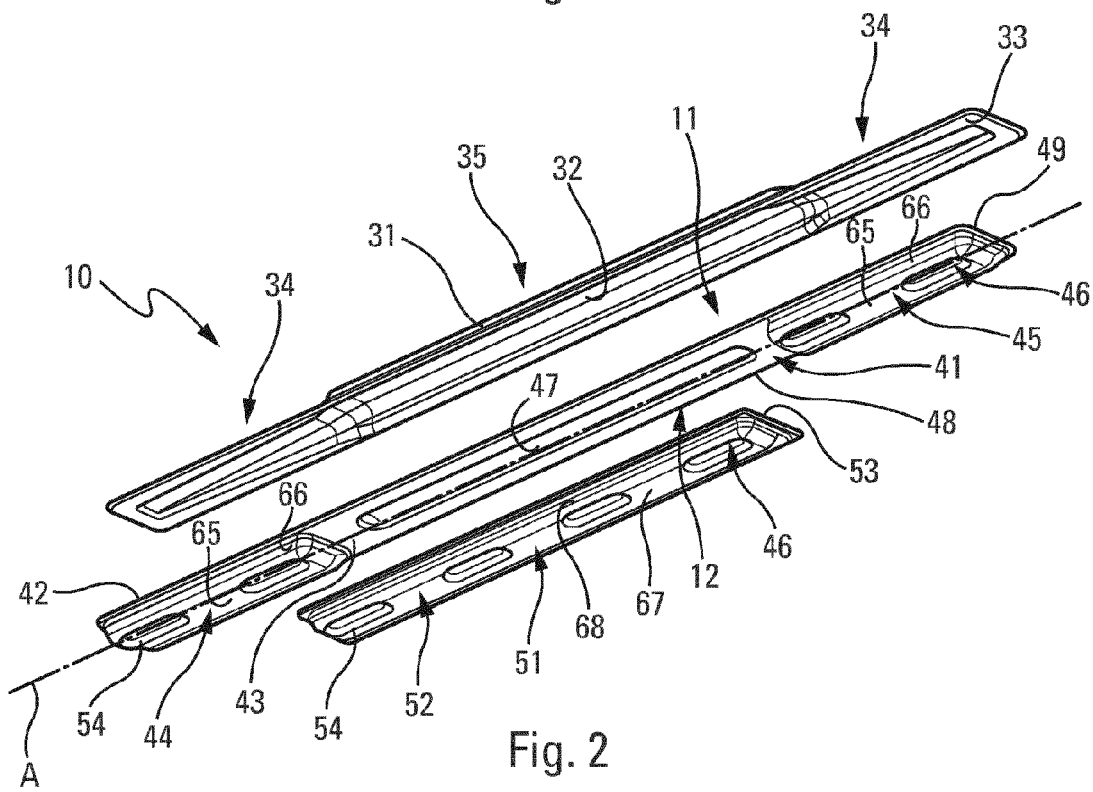
FIG. 2 is an exploded view of a manifold according to the invention.

FIG. 2 represents a more detailed illustration of the first manifold 10 according to the invention. It comprises a cover 31, an intermediary plate 41 and a collector plate 51. According to the invention the intermediary plate 41 defines the first fluid chamber 11 with the cover 31 and the second fluid chamber 12 with the collector plate 51.

The intermediary plate 41 has a first face 42 and a second face 43 opposite the first face 42. The intermediary plate 41 comprises a first deformation 44 intended to admit fluid to the first chamber 11 and a second deformation 45 arranged to allow fluid to leave the first chamber 11. The first and second deformations 44, 45 are, for example, obtained by a process involving dishing of the intermediary plate 41 and thus form dished areas. The first and second deformations 44, 45 protrude with respect to the second face 43 of the intermediary plate 41 in this case, in other words they are positioned on the side of the second face 43 of the intermediary plate 41. They may, for example, comprise a base 65 which extends parallel to the second face 42 and is connected to said face by a peripheral wall 66 which extends perpendicular to the second face 42.

The first and second deformations 44, 45 may, for example, comprise slots 46 intended to receive the first longitudinal end of the tubes 2. These slots 46 may, for example, be oblong, in other words they have an elongated shape in a longitudinal extension direction A of the cover 31, the intermediary plate 41 and the collector plate 51. The cover 31, the intermediary plate 41 and the collector plate 51 are in fact substantially rectangular in shape such that they have a longitudinal extension dimension according to the direction referred to as A in FIG. 2 and a lateral extension direction perpendicular to direction A. Note that the first and second deformations 44, 45 each comprise two slots 46 in this case, but that they could contain more or fewer slots 46 in an alternative embodiment.

The intermediary plate 41 also comprises a third deformation 47 located between the first and second deformations 44, 45 along the longitudinal extension direction A of the plates. This third deformation 47 may, for example, be obtained by a dishing process such as to form a dished area. This protrudes with respect to the first face 42 of the intermediary plate 41, in other words it is positioned on the side of the first face 42 of the intermediary plate. The third deformation 47 then extends inside the first chamber 11. The fluid can thus flow in the first chamber 11 between the first and second deformations 44, 45, passing through the third deformation 47.

The deformation 47 advantageously optimises the volumes of the chambers 11 and 12. Such a deformation 47 balances the fluid passage cross-sections in chambers 11 and 12. It also makes it possible to obtain an optimised pressure loss value by modifying the depth of the deformation 47. It is also advantageous that the fluid passage cross-sections through chambers 11 and 12 are substantially identical to one another.

The cover 31 is positioned opposite the first face 42 of the intermediary plate 41. It covers the first, second and third deformations 44, 45, 47. The cover 31 comprises a cavity 32 which enables fluid to flow between the first deformation 44 and the second deformation 45 of the intermediary plate 41. The cavity 32 may, in particular, be obtained by a dishing process such as to form a dished area. In particular this applies to the cavity 32 which is positioned opposite the first deformation 44, the second deformation 45 and the third deformation 47. The lateral parts 34 of the cavity 32, or in other words the parts of the cavity 32 positioned opposite the first and second deformations 44, 45, are flared in shape. The lateral parts 34 of the cavity 32 are flared towards the inside of the cavity 32, in other words towards an axis of symmetry of the cover perpendicular to the of longitudinal extension direction A. A central part 35 of the cavity 32, or in other words a part positioned opposite the third deformation 47, is deeper than the lateral parts of the cavity 32. The central part 35 of the cavity 32 is arranged between the lateral parts 34. Thanks to the cover 31 and in particular thanks to its cavity 32, the fluid can flow into the first chamber 11, and in particular inside the cavity 32, from the first deformation 44 via which the fluid enters, to the second deformation 45, via which the fluid leaves the first chamber 11.

The cover 32 comprises an edge 33 located around the periphery of the cavity 32 and in contact with a rim 49 of the first face 42 of the intermediary plate 41 surrounding the first, second and third deformations 44, 45, 47. The cover 31 and the intermediary plate 41 are soldered in particular at the edge 33 of the cover 31 and the rim 49 of the first face 42 of the intermediary plate 41. In particular, the shape of the edge 33 complements the shape of the rim 49 of the first face 41 and they are flat, for example.

The collector plate 51 is opposite the second face 43 of the intermediary plate 41, in particular in the vicinity of the third deformation 47. The collector plate 51 thus forms part of the second chamber 12 in which fluid can flow, together with the inside of the third deformation 47.

The collector plate 51 comprises a recess 52 intended to allow fluid to enter and leave the second chamber 12. The recess 52 is, in particular, similar to the first and second deformations 44, 45 of the intermediary plate 41. The first deformation 44, the second deformation 45 and the recess 52 thus extend from the same side with respect to the intermediary plate 41, in other words from the side of the first face 42 and are substantially the same depth as the intermediary plate 41.

In this case the collector plate 51 comprises a peripheral face 53 which surrounds the recess 52 and is in contact with a rim 48 of the second face 43 of the intermediary plate 41. The collector plate 51 and the intermediary plate 41 are soldered together in particular at the peripheral face 53 of the collector plate 51 and the rim 48 of the second face 43 of the intermediary plate 41. In particular, the shape of the peripheral face 53 complements the shape of the rim 48 of the second face 43 and is flat, for example.

The recess 52 may, for example, comprise a base 67 which extends parallel to the peripheral face 53 and in the same plane as that in which the base 65 of the first and second deformations 44, 45 extend. The base 67 of the recess 52 is connected to the peripheral face 53 by a peripheral wall 68 identical to the peripheral wall 66 of the first and second deformations 44, 45.

The recess 52 also comprises four slots 46 intended to receive the ends of the tubes. In particular, the recess 52 comprises two slots, positioned on the left in FIG. 2, via which the fluid leaves the second chamber 12 and two slots 43, positioned on the right in FIG. 2, via which the fluid enters the second chamber 12. In other words, the recess 52 comprises two slots 46 which are intended to receive the tubes bringing fluid into the second chamber 12 and two slots 46 intended to receive the tubes discharging fluid from the second chamber 12.

The slots 46 in the first deformation 44, the second deformation 45 and the recess 52 comprise an opening 54 to the outside of said manifold, which is located in the vicinity of the respective bases 65, 67 of the first deformation 44, the second deformation 45 and the recess 52. In other words, the openings 54 are positioned in substantially the same plane, for example parallel to a plane in which the rim 49 of the first face 42 extends, and in particular parallel to an extension plane of the cover 31, the intermediary plate 41 or the collector plate 51. The tubes are inserted in the slots 46 via the opening 54. The slots 46 extend over the same depth in a direction which is perpendicular to the extension planes of the plates and emerge on the inside of the first chamber 11 and the second chamber 12 in the vicinity of second openings, which are not visible and which also extend along the same plane. This thus creates a tube reception ring to facilitate soldering of said tubes onto the first manifold 10.

Figure 3:
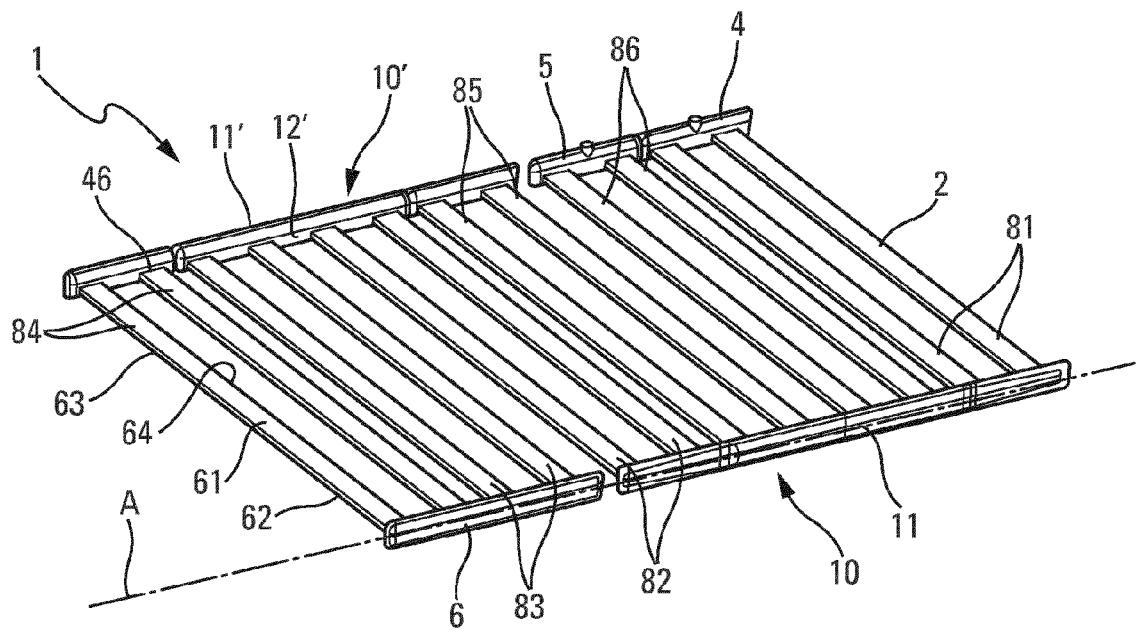
FIG. 3 is a perspective view of an alternative embodiment of the exchanger shown in FIG. 1.

An alternative embodiment of the exchanger 1 according to the invention is shown in FIG. 3. Such an exchanger 1 comprises a second manifold 10' which is identical to the first manifold 10. This alternative makes it possible to connect an additional exchanger in series from a fluid point of view so as to enlarge the available area for heat exchanges with the batteries.

The exchanger 1 defines six passages for the fluid in this case, each of said passages being defined by two tubes 2 in particular:
a first passage 81 between the inlet enclosure 4 and the first chamber of the first manifold 10,
a second passage 82 between the first chamber 11 of the first manifold 10 and the second chamber 12' of the second manifold 10',
a third passage 83 between the second chamber 12' of the second manifold 10' and the intermediate enclosure 6,
a fourth passage 84 between the intermediate enclosure and the first chamber 11' of the second manifold 10',
a fifth passage 85 between the first chamber 11' of the second manifold 10' and the second chamber of the first manifold 10 and
a sixth passage 86 between the second chamber of the first manifold 10 and the outlet enclosure 5.

The first manifold 10 and the intermediate enclosure 6 receive the first longitudinal ends of the tubes 2 in this case. The second manifold 10', the inlet enclosure 4 and the outlet enclosure 5 receive the second longitudinal ends of the tubes 2, in particular, these being opposite the first ends with respect to the tubes 2. Note that the tubes 2 are the same length thanks to the position of the slots 46 and in particular their openings.

The tubes 2 have two large faces, referred to as the first and second large faces 61, 62, and two small faces 63, 64, connecting the large faces 61, 62 to one another. The small and large faces 61, 62, 63, 64 connect the longitudinal ends of the tubes 2 to one another such that the tubes 2 are substantially oblong in shape. Thanks to the direction A of extension of the slots 46, the plurality of tubes 2 constituting the tube bundle is arranged such that the first large faces 61 of the tubes 2 extend in the same plane, in particular perpendicular to the lateral extension dimension of the cover, the intermediary plate and the collector plate. It is thus possible to position batteries directly on the large faces 61 of the tubes 2 so as to benefit from a large contact surface between the tubes 2 and the batteries.

Figure 4:
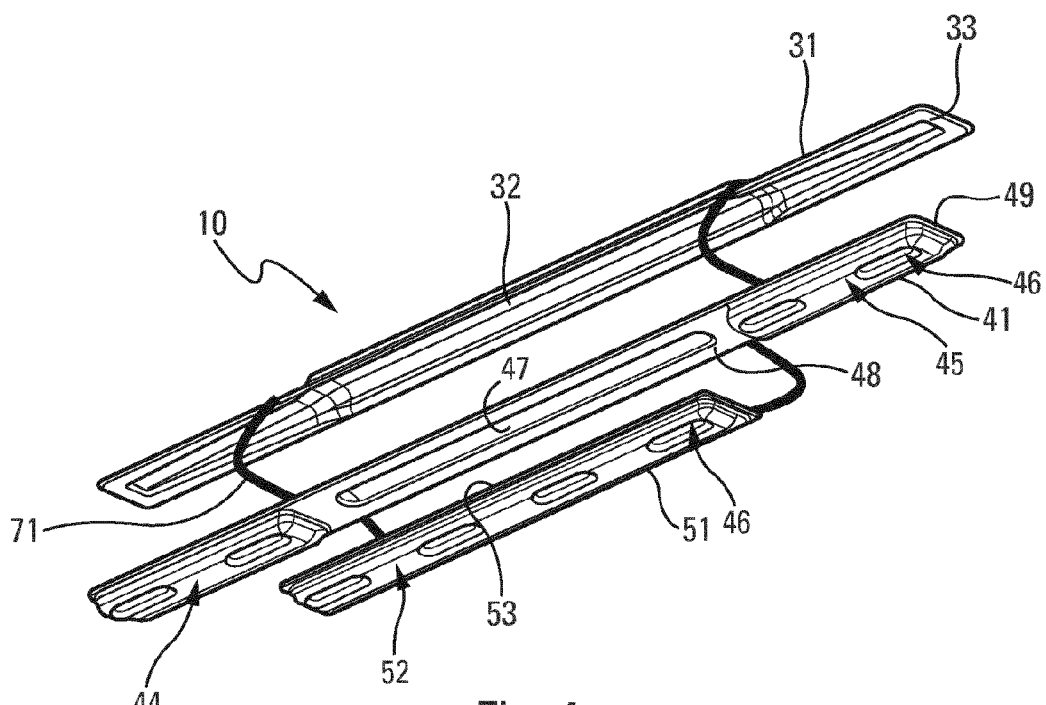
FIG. 4 shows an exploded view of a manifold according to the invention and disconnectable connection means connecting a cover, an intermediary plate and a collector plate of the manifold.

FIG. 4 shows the first manifold 10 before assembly and as obtained after a production method according to the invention.

This method entails dishing and cutting a sheet in the same forming stage so as to obtain the cover 31, the intermediary plate 41 and the collector plate 51 on the one hand and on the other hand a disconnectable mechanical connection 71 which connects the cover 31, the intermediary plate 41 and the collector plate 51 to one another.

By dishing the cover 31, the plate 41 and the collector plate 51, it is possible to obtain in particular the cavity 32, the first, second and third deformations 44, 45, 47, the recess 52 and the slots 46 described above.

The disconnectable mechanical connection means 71 is shown here in the form of strips of the same material as the first manifold 10. In the illustrated example two strips connect the cover 31 to the intermediary plate 41 and two strips connect the intermediary plate to the collector plate 51.

The invention also provides a stage in which the connection means 71 is disconnected. In this case, the strips are disconnected, for example, by folding them at the junctions with the cover 31, the collector plate 41 and/or the intermediary plate 51, in other words at the boundary of the edge 33 of the cover 31, the rim 49 of the first face of the intermediary plate 41, the rim 48 of the second face of the intermediary plate 41 and/or the peripheral face 53 of the collector plate 51. The cover 31, the intermediary plate 41 and the collector plate 51 are then separated from one another and it is possible to position them against one another so that they can be soldered together.

Such a solution means that a set of three components can be stored as one, in other words, the cover 31, the intermediary plate 41 and the collector plate 51 with a view to assembling and then soldering said components. It is thus not necessary to manage specific stocks for each component.

According to an alternative embodiment of the method (not illustrated), the invention provides for the collector plate to be created between the cover and the intermediary plate, in other words the collector plate is located on the sheet between the cover and the intermediary plate during the forming operation. In this case the connection means extend between the collector plate and the intermediary plate on the one hand and between the collector plate and the cover on the other hand. Thus, due to the length of the collector plate which has smaller dimensions than the cover and the intermediary plate, the forming operation allows the collector plate, the cover and the intermediary plate to be produced together. It is thus possible to use the material resulting from the parts of the sheet surrounding the collector plate to flow towards the parts of the sheet used for the cover and the intermediary plate. Such an arrangement of the collector plate, the intermediary plate and the cover is advantageous in that it enables substantially the same material thickness to be maintained.

The various components of the exchanger and, in particular the manifold/s are made from aluminium or aluminium alloy, for example.

The invention claimed is:

1. A manifold for a heat exchanger, the manifold comprising a cover, an intermediary plate and a collector plate, with the manifold collecting and distributing a fluid, wherein the intermediary plate defines a first fluid chamber with the cover and a second fluid chamber with the collector plate, the second chamber being independent of the first chamber, wherein the intermediary plate comprises at least two slots,
   wherein the intermediary plate has a first face and a second face opposite the first face and the intermediary plate comprises a first deformation for admitting fluid to the first chamber and a second deformation for allowing fluid to leave the first chamber,
   wherein the intermediary plate further comprises a third deformation located between the first and second deformations along a longitudinal direction of the manifold, and
   wherein the collector plate comprises a recess for allowing fluid to enter and leave the second chamber.

2. A manifold according to claim 1, wherein the third deformation protrudes with respect to the first face of the intermediary plate, the first and second deformations of the intermediary plate protruding with respect to the second face of the intermediary plate.

3. A manifold according to claim 1, wherein the cover comprises a cavity for allowing fluid to flow between the first deformation and the second deformation.

4. A manifold according to claim 3, wherein the cover comprises an edge located on the periphery of the cavity and arranged in contact with a rim of the intermediary plate surrounding the first, second and third deformations.

5. A manifold according to claim 1, wherein the cover is positioned opposite the first face of the intermediary plate, in a position covering the first, second and third deformations.

6. A manifold according to claim 1, wherein the collector plate is positioned opposite the second face of the intermediary plate, in a position covering the third deformation.

7. A manifold according to claim 1, wherein the collector plate comprises a peripheral face surrounding the recess and is arranged in contact with a rim surrounding the third deformation of the intermediary plate.

8. A manifold according to claim 1, wherein the first deformation, the second deformation and the recess each comprise at least one slot which is capable of receiving a fluid flow tube.

9. A manifold according to claim 8, wherein the cover, the intermediary plate and the collector plate are substantially rectangular in shape, the slots having an elongated shape in a direction which runs substantially parallel to a longitudinal axis of the cover, the intermediary plate or the collector plate.

10. A heat exchanger comprising a manifold and a bundle of fluid flow tubes each having a first longitudinal end, the manifold comprising a cover, an intermediary plate and a collector plate, with the manifold collecting and distributing a fluid, wherein the intermediary plate defines a first fluid chamber with the cover and a second fluid chamber with the collector plate, the second chamber being independent of the first chamber, wherein the intermediary plate comprises at least two slots, with each one of the at least two slots receiving the longitudinal end of a respective one of the bundle of fluid flow tubes,
   wherein the intermediary plate has a first face and a second face opposite the first face and the intermediary plate comprises a first deformation for admitting fluid to the first chamber and a second deformation for allowing fluid to leave the first chamber,
   wherein the intermediary plate further comprises a third deformation located between the first and second deformations along a longitudinal direction of the manifold, and
   wherein the collector plate comprises a recess for allowing fluid to enter and leave the second chamber.

11. A heat exchanger according to claim 10, wherein the fluid flow tubes are the same length.

12. A heat exchanger according to claim 11, wherein the fluid flow tubes are extruded and comprise a plurality of channels.

13. A heat exchanger according to claim 11, wherein the fluid flow tubes are substantially oblong in shape, defined by first and second large faces and two small faces, the fluid flow tubes being arranged such that the first large face of the fluid flow tubes extends in the same plane.

14. A heat exchanger according to claim 10, wherein the heat exchanger is arranged such that the fluid flows into the first chamber in a first direction and into the second chamber in a second direction which is opposite to the first direction.

15. A heat exchanger according to claim 10, wherein the heat exchanger further comprises an inlet enclosure comprising a fluid inlet, an outlet enclosure comprising a fluid outlet and an intermediate enclosure such that the heat exchanger defines four fluid passages: a first passage between the inlet enclosure and the first chamber, a second passage between the first chamber and the intermediate enclosure, a third passage between the intermediate enclosure and the second chamber and a fourth passage between the second chamber and the outlet enclosure.

16. A method for producing a manifold of a heat exchanger according to claim 1, the manifold comprising a cover, an intermediary plate and a collector plate, the intermediary plate being intended to define a first fluid chamber with the cover and a second fluid chamber with the collector plate, the second chamber being independent from the first chamber, wherein the intermediary plate comprises at least two slots,
   wherein the intermediary plate has a first face and a second face opposite the first face and the intermediary plate comprises a first deformation for admitting fluid to the first chamber and a second deformation for allowing fluid to leave the first chamber,
   wherein the intermediary plate further comprises a third deformation located between the first and second deformations along a longitudinal direction of the manifold,
   wherein the collector plate comprises a recess for allowing fluid to enter and leave the second chamber, and
   wherein the cover, the intermediary plate and the collector plate are dished and in that a disconnectable mechanical connection means is formed between the cover, the intermediary plate and the collector plate in the same forming stage.

17. A method according to claim 16, wherein the mechanical connection means is disconnected prior to assembling the cover on the intermediary plate and the collector plate on the intermediary plate with a view to forming the manifold.

* * * * *